United States Patent [19]

Davies

[11] 4,250,653
[45] Feb. 17, 1981

[54] HUMANE ANIMAL TRAP

[76] Inventor: Elmer T. Davies, Duane Rd., St. Regis Falls, N.Y. 12980

[21] Appl. No.: 9,492

[22] Filed: Feb. 5, 1979

[51] Int. Cl.³ .......................................... A01M 23/34
[52] U.S. Cl. ............................................................. 43/87
[58] Field of Search ................................. 43/85, 86, 87

[56] References Cited

U.S. PATENT DOCUMENTS

| 543,206 | 7/1895 | Butzer | 43/86 |
|---|---|---|---|
| 807,969 | 12/1905 | Shelley | 43/86 |
| 2,168,132 | 8/1939 | Marshall | 43/87 |
| 2,257,299 | 9/1941 | Herstedt | 43/85 |
| 2,544,145 | 3/1951 | Ellwein | 43/87 |
| 2,700,844 | 2/1955 | Pastuck | 43/87 |
| 3,068,608 | 12/1962 | Counts | 43/87 |
| 3,967,408 | 7/1976 | Aberg | 43/87 |

FOREIGN PATENT DOCUMENTS 23583 of 1908 United Kingdom ...................... 43/87

Primary Examiner—Harold D. Whitehead
Attorney, Agent, or Firm—Sherman & Shalloway

[57] ABSTRACT

A humane animal trap having a snare which is closed in position. The snare is a formed loop having ends which pass through a hollow telescoping system. The telescoping means is comprised of a main barrel connected to the loop, a slave barrel within the main barrel, and a working barrel within the slave barrel. The barrels are biased in an extended position by a spring which is connected between the main barrel and working barrel. A trigger prevents extension of the barrels and is selectively held in position by a trip. The trip is comprised of a trip sear which engages the trigger and a trip pan which forms an acute angle, preferably 30°, with the axis of the barrels. When the trap is arranged for use, the trip pan is located within the loop and an animal entering the loop and contacting the trip pan causes the trip pan and trip sear to move and release the trigger. This permits the spring to extend the barrels thereby enclosing a greater portion of the loop within the barrels and causing the loop to close around the animal forming a 270° loop.

3 Claims, 4 Drawing Figures

HUMANE ANIMAL TRAP

BACKGROUND OF THE INVENTION

1. Field of the Invention

The invention generally relates to animal traps and, more specifically, is concerned with a humane animal trap which is effective on small animals without physical injury to the animals.

2. Description of the Prior Art

The prior art discloses many types of animal traps which employ a snare or similar type of structure which closes around an animal's leg upon activation. For example, Steiner has invented humane traps such as disclosed in U.S. Pat. Nos. 3,835,576 and 3,962,814 wherein a pair of rings pivotally secured together at one side thereof in juxtaposition with one another close upon an animal's leg when activated. U.S. Pat. Nos. 3,402,959; 3,967,408 and 936,808 are examples of other types of snare structures in which a loop is drawn within a structure, forcing the loop to close upon an animal located within the loop.

Other types of traps such as disclosed by Petty in U.S. Pat. No. 2,396,472 employs a fixed, rigid loop in spring-biased relationship to an opening, the loop closing upon triggering and trapping the animal within the rigid loop and opening.

Manually actuated traps are also known in the prior art as disclosed, for example, by Rosser in U.S. Pat. No. 3,540,769 wherein telescoping members close a loop upon manual actuation.

The above structures are limited in that they fail to be humane or fail to be useful upon small animals. Most traps which are effective on small animals tend to break the animal's leg or skin upon actuation, thereby being inhumane. On the other hand, traps which are designed not to physically injure the trapped animal are usually ineffective against small, quick animals, such as foxes, rabbits and squirrels.

SUMMARY OF THE INVENTION

It is an object of the invention to disclose a humane animal trap which can easily and effectively trap small, quick animals without incurring injury to the animals.

It is a further object of this invention to describe an animal trap which holds an animal with a zero level of spring tension, thereby holding the animal by a limb without constricting the blood flow in the limb.

It is another object of this invention to describe a trap which may be set in the same manner as the prior art steel-jaw type traps so that trapper retraining is unnecessary.

It is a further object of this invention to describe a trap which allows for selectivity of target species, is light weight, small size and low cost with very few moving parts, thereby being easy to manufacture.

It is a further object of this invention to provide a snare type trap which can be easily concealed and remains efficient under all weather conditions and temperature changes.

The trap is comprised of a snare type structure which is connected to a snare closing means which permits closure of the snare in position. A trip means for activating the snare closure means is located within the snare so that an animal positioned in the snare will activate the trap. The trap functions on a telescoping principle wherein a full length spring is compressed within telescoping barrels which are set in position. A 26-inch neoprene-coated cable is doubled and clamped at its ends to form a loop. The clamped ends are connected to the outer most telescoping barrel and pass through the telescoping barrels and the full length of the spring to protrude beyond the trap to form a catching and holding device. A trigger mechanism is connected to the outer most barrel and holds the barrels in compressed condition. A trip system associated with the trigger mechanism is arranged within the catching and holding device. When an animal enters the catching and holding portion forming a 270° loop, the barrels move forward and close the loop in the original position. The function of the telescoping barrels prevents the cable from pulling to close the loop and does not force or change the position of the animal's foot within the loop. This aspect of the invention allows it to catch light-footed animals such as foxes, coons, coyotes, and cats and prevents injury to the animal.

The trip mechanism is comprised of a trip pan connected to a trip sear which is hinged to the outer most barrel. The plane of the trip pan forms an acute angle with an axis of the telescoping barrels so that the trap may be angularly embedded into the earth.

BRIEF DESCRIPTION OF THE DRAWINGS

These objects and features of the invention as well as others will become apparent to those skilled in the art by referring to the following specification and accompanying drawings in which:

FIG. 3 is a side view of the humane animal trap located within the ground in position.

DETAILED DESCRIPTION OF THE PREFERRED EMBODIMENT

The trap is comprised of three functional sections: the catching and holding device; means for closing the catching and holding device; and means for activating the closing means. In the disclosed and claimed invention, the catching and holding device is preferably a snare or cable 11 which is formed from a 26-inch length of neoprene-coated steel cable joined by a crimp 14.

Figure 2:
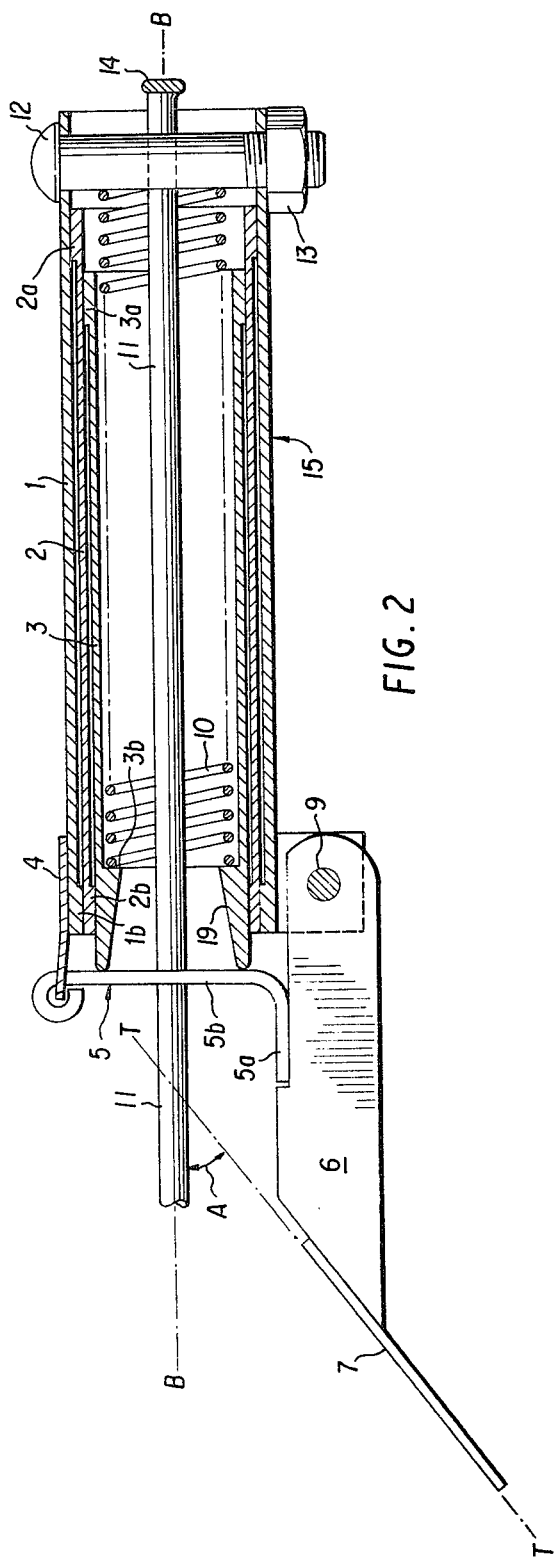
FIG. 2 is a longitudinal section view taken along lines 1—1 of FIG. 1.

The catching and holding device closing means is comprised by a plurality of telescoping barrels generally referred to by reference character 15. In the preferred embodiment, the telescoping barrels system 15 is made up of an outer main barrel 1 having located therein a slave barrel 2 enclosing a working barrel 3. As can be seen by referring to FIG. 2, the left end portion of the main barrel 1 has an inwardly radially located flange 1b for engaging an outwardly radially located flange 2a located on the right end of the slave barrel 2. Similarly, the left end of the slave barrel 2 has an inwardly located flange 2b for engaging an outwardly located flange 3a on the right end of the working barrel 3.

A biasing means such as spring 10 is connected between the innermost and outermost barrels to bias the telescoping members 15 in an extended position. The spring 10 preferably engages an inwardly located flange 3b located on the left side of the working barrel 3 and also engages the right end of the main barrel 1 via a bolt 12 which passes through the right end of the main barrel 1 and is held in place by nut 13. However, it is contemplated that the spring 10 may engage the working barrel along any portion thereof and may engage the main barrel 1 by any convenient means such as an inwardly located flange or threaded arrangement. Further, it is contemplated that the spring may be variable in its strength and resiliency. For example, the spring may be designed to engage the inward portion of the working barrel 3 at different locations within the working barrel so that, depending on the engagement point, the compression and therefore the force of the spring would be adjustable.

The means for activating the telescoping barrels 15 is comprised of a trip mechanism in combination with a trigger mechanism which holds the innermost barrel in compression within the other barrels. In the preferred embodiment, the trigger mechanism is comprised of a trigger carrier 4 which is banded about the outer main barrel 1 and a trigger 5 which is an L-shaped pin hingedly attached to the trigger carrier 4. Opposing the hinged trigger 5 is a trip sear 6 hingedly attached to the lower portion of the trigger carrier 4 via a nut 9 and bolt 8. The trip sear 6 is connected to a trip pan 7 which has an axis T—T which forms an acute angle, preferably 30°, with an axis B—B of the telescoping barrels 15. This acute angle A which is formed between the axis T—T and the axis B—B is a critical feature of the invention. In particular, the acute angle A permits the proper concealment of the telescoping barrels so that the mechanism of the trap is not easily detected. In addition, the angle A allows for the location of the bait-hole immediately above the telescoping barrels thereby enhancing the trapping location of an animal which is attempting to raid the bait-hole. Finally, the acute angle A tends to cause the telescoping barrels 15 to project upward as they expand. This results in the loop 11 similarly being projected upward and onto an animal which has located itself within the loop 11 and has tripped the expansion of the telescoping barrels 15.

Referring in more detail to the trip mechanism and, particularly, the trigger 5, it is noted that the trigger 5 is comprised of an optional stop portion 5a which engages the left end of working barrel 3 and a hook portion 5b which engages a notch 16 in the trip sear 6. The left end of the hook 5b and the notch 16 form the engagement point for the trigger and the height of the notch H determines the amount of movement required by trip sear 6 before the telescoping barrels 15 are released for expansion. By controlling the longitudinal position of the notch 16 along the trip sear 6 and by controlling the height H of the notch 16, the sensitivity of the trip mechanism can be regulated. In particular, by increasing the length of hook 5b and by decreasing the height H of the notch 16, the trip mechanism can be made more sensitive.

Figure 1:
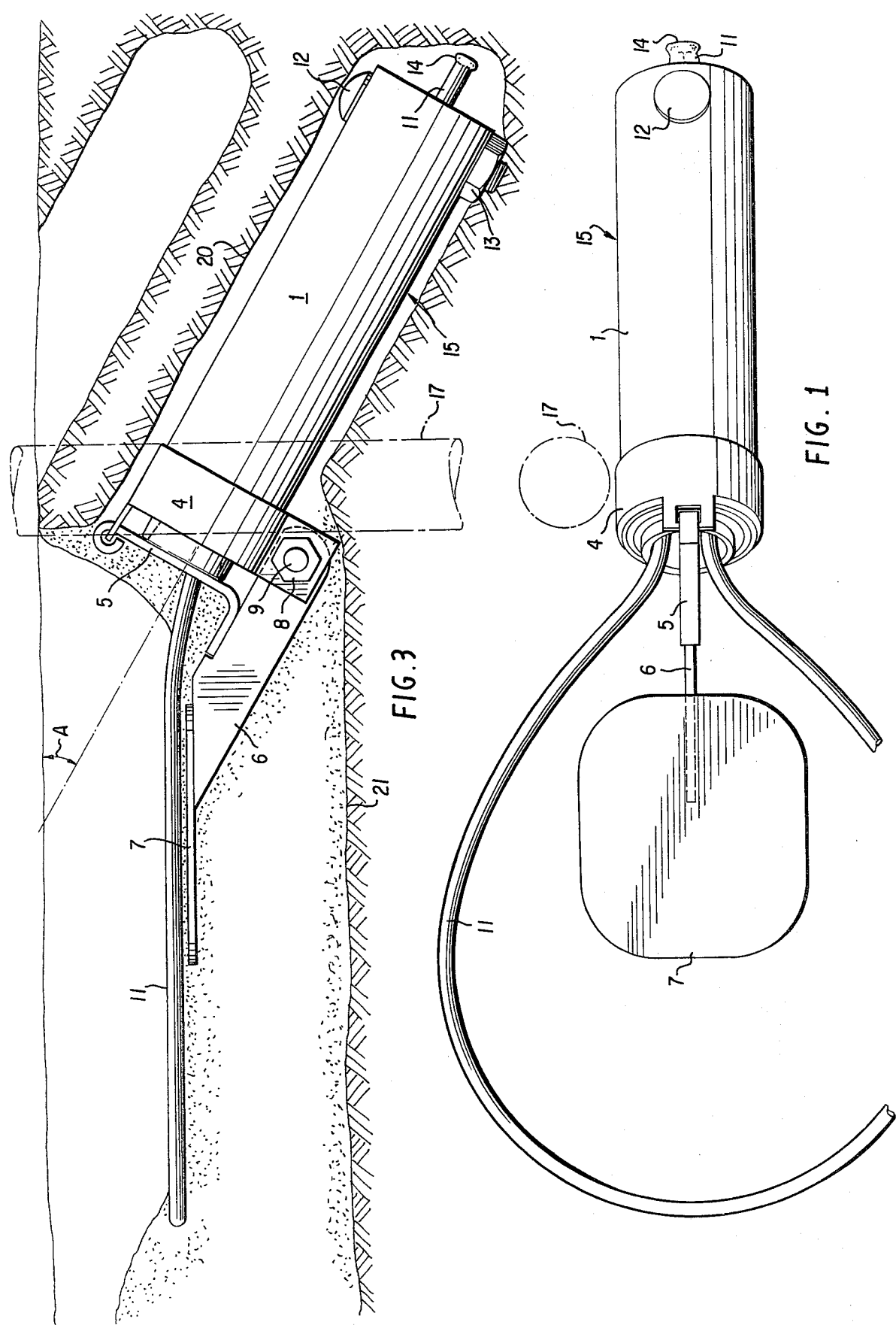
FIG. 1 is a top plane view of the humane animal trap in position in the ground.

Referring to FIGS. 1 and 3, the specific location of the trap within the earth can be appreciated. In general, it is contemplated that an angular hole 20 be located within the earth for receiving the telescoping barrels 15 and that a pan-shaped opening 21 be located adjacent the hole 20 and be approximately four inches deep. The trap is located within the hole 20 and opening 21 with approximately two inches of sifted dirt located below the trip pan 7 and approximately ⅛ inch of sifted dirt placed onto the trip pan. The loop 11 is located approximately 1 inch below ground level and surrounds the trip pan 7. A parallel bait-hole is located immediately above the hole 20.

MODE OF OPERATION OF THE INVENTION

The telescoping members are retracted to a compressed condition and trigger 5 is placed in front of the working barrel 3 engaging the notch 16 in trip sear 6. The trap is located in the ground as indicated above, attached to a stake 17 or other fixed structure by any convenient connection means (not shown) and appropriately covered with sifted dirt. The proper type of bait is located within the bait hole. It is contemplated that an animal attempting to obtain the bait will be required to locate itself within the pan-shaped opening 21 due to the angle of the bait hole. When an animal enters the pan-shaped opening 21, this necessarily results in the movement of the trip pan 7 downwardly slightly compressing the sifted dirt located below the trip pan 7. Such movement disengages the trigger 5 from the trip sear 6 thereby allowing the telescoping barrels 15 to expand and close the loop in position. The closed portion of the loop is joined by crimp 14 around bolt 12 and is thereby held in engagement with the end of outer working barrel 1. The end result is the trapping and holding of an animal with a zero level of spring tension.

Figure 4:
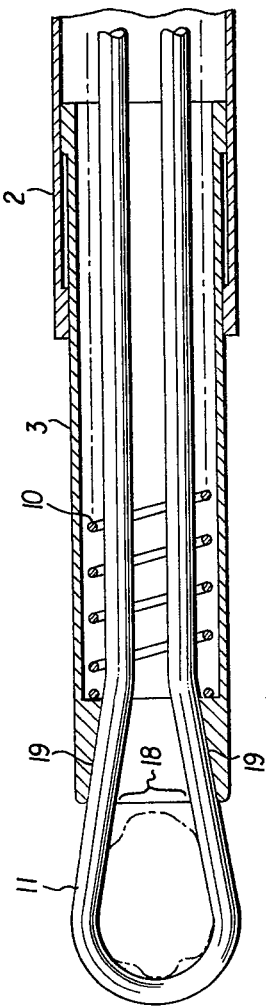
FIG. 4 is a sectional view of the working barrel and loop engaging an animal's limb.

Tests have shown the above-described invention to be significantly effective against light-footed, small, quick animals such as foxes, coons, coyotes and cats. In addition, such tests have proven the invention to be humane in that injury of the caught and held animal is prevented. In particular, the trap retains an animal without constricting or otherwise affecting blood flow. This is in contrast to prior art systems and jaw-type traps which constrict blood flow and cause numbness, permitting the animal to gnaw at its limbs thereby resulting in release at the expense of injury and loss of the limb. One critical reason for this invention accomplishing a humane result is the fact the loop formed around the limb 20 of a trapped animal is a 270° arc (see FIG. 4). This is in contrast to the prior art snares which effectively form a 360° circle around a trapped limb, thereby unnecessarily cutting off the entire blood supply to the trapped limb. Note that the working barrel 3 has interior tapering walls 19 which aid in the formation of this 270° arc and prevent total blood constriction by allowing blood flow in the non-constricted area 18 of the trapped limb 20.

Generally, the spring 10 is contemplated to be approximately 11 inches long and made of carbon steel. This dimension contemplates a loop pressure of approximately three pounds, seven ounces at a ⅜ inch cable opening and a loop pressure of approximately seven pounds at a zero cable opening. Tables 1 and 2 indicate the results of a spin test wherein the numbers noted in the tables indicate the number of turns required to abrade hair or break skin of the indicated animals when caught in the above-described invention.

TABLE 1

| 3 lbs. 7 oz. Pressure at ⅜" Cable Opening | | | | |
| --- | --- | --- | --- | --- |
| ANIMAL | Bobcat | Grey Fox | Coyote | Woodchuck |
| HAIR | 575–800 | 700–1600 | 300–1700 | 300–550 |
| SKIN | 1000* | 1200–2800 | 1200*–2800 | 1200* |

*No break

TABLE 2

| 7 lbs. Pressure at Zero Cable Opening | | | | |
|---|---|---|---|---|
| ANIMAL | Bobcat | Grey Fox | Coyote | Woodchuck |
| HAIR | 600-700 | 600-800 | 800-1500 | 250-350 |
| SKIN | 1000* | 700*-1600 | 1000-2200 | 1000* |

*No break

The above results are considered unexpected and unique when compared to the fact that a No. 2 steel trap (jaw-type) at factory set pressure abrades hair at 4-17 turns and breaks skin in 6-20 turns when the above animals are caught in such a jaw-type device.

Various changes may be made in the details of the invention, as disclosed, without sacrificing the advantages thereof or department from the scope of the appended claims. Furthermore, although the present invention has been disclosed and discussed with particular regard to its exceptional advantages in terms of humane animal trapping, it may be understood that the invention may be employed in several applications wherein a humane trapping and holding appliance is desired.

I claim:

1. A humane animal trap adaptable to extend toward an animal to ensnare the animal's leg while not blocking blood flow through said leg comprising:
   (a) telescoping means having at least two interconnected, hollow telescoping members which may be moved relative to each other;
   (b) biasing means connected between said members to bias said members apart so that said telescoping means is biased in an extended position;
   (c) trigger means connected to said members for selectively retaining said telescoping means in a retracted position;
   (d) trip means associated with said trigger means for releasing said trigger means;
   (e) loop means having a first portion attached to one of said members and having a second portion extending beyond said telescoping means whereby activation of said trip means releases said trigger means, causing said biasing means to force said members apart thereby placing said telescoping member in the extended position, the telescoping means extending toward the second portion to close the trap, wherein said telescoping means is comprised of a main barrel having first and second ends, a slave barrel located within said main barrel and having first and second ends, and a working barrel located within said slave barrel and having first and second ends, wherein the second end of the main barrel engages the first end of the slave barrel, the second end of the slave barrel engages the first end of the working barrel and the biasing means is connected between the working barrel and the first end of the main barrel, said trigger means is a rigid element having first and second ends, the first end of the rigid element being hingedly affixed to the second end of the main barrel, and said trip means is a rigid element having first and second ends, the first end of the trip means being hingedly affixed to the second ends of said main barrel, said rigid member releasably engaging the second end of said rigid element and selectively retaining said rigid element in a position to prevent said slave barrel and said working barrel from extending apart from said main barrel whereby movement of said rigid member causes said rigid member to disengage said rigid element thereby permitting said biasing means to extend said slave barrel and said working barrel apart from said main barrel, said loop means is a length of cable having ends connected to said main barrel and having a middle portion extending through and beyond said working barrel to form a loop, said biasing means is a spring having a first end engaging the first end of said main barrel and having a second end engaging the second end of said working barrel, said spring being in a compressed condition when said barrels are in a retracted position, said trip means is located within the second portion of said loop means, said trip means is comprised of a trip sear hinged to an outer barrel of said telescoping means, and a trip pan is connected to said trip sear, said trip pan forming an acute angle with an axis of said telescoping means.

2. The humane animal trap of claim 1, wherein said working barrel has interior tapering walls thereby facilatating said loop means in forming an approximate 270° arc around an object trapped within the trap.

3. The humane animal trap of claim 1, wherein said rigid element is L-shaped and engages a notch in said rigid member.

* * * * *